(12) United States Patent
Toole et al.

(10) Patent No.: US 10,065,616 B2
(45) Date of Patent: Sep. 4, 2018

(54) APPARATUS AND METHOD FOR A MOTION CONTROL SYSTEM

(71) Applicant: Breaker Technology, Inc., Solon, OH (US)

(72) Inventors: Brad D. Toole, Collingwood (CA); Andy Jackson, St. Allenford (CA); Chris Marchl, Collingwood (CA); Gary Posey, Thornbury (CA)

(73) Assignee: Breaker Technology, Inc., Solon, OH (US)

( * ) Notice: Subject to any disclaimer, the term of this patent is extended or adjusted under 35 U.S.C. 154(b) by 0 days.

(21) Appl. No.: 15/450,310

(22) Filed: Mar. 6, 2017

(65) Prior Publication Data

US 2017/0259798 A1 Sep. 14, 2017

Related U.S. Application Data

(60) Provisional application No. 62/307,098, filed on Mar. 11, 2016.

(51) Int. Cl.
| | |
|---|---|
| *B60T 8/48* | (2006.01) |
| *B60L 11/18* | (2006.01) |
| *B60L 7/26* | (2006.01) |
| *B60T 10/04* | (2006.01) |
| *B60T 13/14* | (2006.01) |
| *B60T 7/12* | (2006.01) |
| *B60W 10/00* | (2006.01) |
| *F16D 57/06* | (2006.01) |

(Continued)

(52) U.S. Cl.
CPC ............ *B60T 8/4863* (2013.01); *B60K 41/00* (2013.01); *B60L 7/26* (2013.01); *B60L 11/18* (2013.01); *B60T 7/12* (2013.01); *B60T 10/04* (2013.01); *B60T 13/14* (2013.01); *F16D 57/06* (2013.01); *B60T 1/093* (2013.01); *B60T 8/3275* (2013.01); *B60T 8/48* (2013.01)

(58) Field of Classification Search
CPC .............................. B60T 10/04; B60T 8/4827
See application file for complete search history.

(56) References Cited

U.S. PATENT DOCUMENTS

| 5,390,759 A * | 2/1995 | Gollner ................. F16H 61/421 |
| | | 180/307 |
| 6,582,339 B2 * | 6/2003 | Damm ................. B60K 7/0015 |
| | | 180/372 |

(Continued)

*Primary Examiner* — Brian L Swenson
(74) *Attorney, Agent, or Firm* — Chambliss, Bahner & Stophel, P.C.

(57) ABSTRACT

A motion control system adapted for use on a vehicle having a prime mover with a power range and a speed range and at least one wheel. The preferred motion control system comprises a first control device that is operatively connected to the prime mover, a pump that is operatively connected to the prime mover and adapted to convey fluid, a second control device that is operatively connected to the pump, a fluid line that is adapted to convey fluid from the pump, a motor that is adapted to receive fluid from the fluid line and control the rotational speed of the at least one wheel, and a microprocessor that is adapted to provide a required amount of power and speed infinitely proportional through the power and speed range of the prime mover. A method for controlling the motion of a vehicle.

21 Claims, 10 Drawing Sheets

(51) Int. Cl.
*B60T 1/093* (2006.01)
*B60T 8/32* (2006.01)

(56) References Cited

U.S. PATENT DOCUMENTS

| | | | | |
|---|---|---|---|---|
| 6,848,753 | B2* | 2/2005 | Tanaka | B60T 8/26 |
| | | | | 303/113.5 |
| 6,966,180 | B2* | 11/2005 | Deneir | F04B 49/08 |
| | | | | 60/327 |
| 7,597,172 | B1* | 10/2009 | Kovach | F16H 47/02 |
| | | | | 180/305 |
| 7,849,688 | B2* | 12/2010 | Dvorak | B60W 10/103 |
| | | | | 60/456 |
| 8,020,659 | B2* | 9/2011 | Schultz | B60W 10/103 |
| | | | | 180/301 |
| 8,286,748 | B2* | 10/2012 | Takahashi | F16H 61/431 |
| | | | | 180/305 |
| 8,540,048 | B2* | 9/2013 | Will | F16H 61/4017 |
| | | | | 180/307 |
| 9,057,437 | B2* | 6/2015 | Kaneko | F16H 61/431 |
| 2014/0014447 | A1* | 1/2014 | O'Connell | B64C 25/44 |
| | | | | 188/151 R |

* cited by examiner

APPARATUS AND METHOD FOR A MOTION CONTROL SYSTEM

CROSS-REFERENCES TO RELATED APPLICATIONS/PATENTS

This application relates back to and claims the benefit of priority from U.S. Provisional Application for Patent Ser. No. 62/307,098 titled "Braking System" and filed on Mar. 11, 2016.

FIELD OF THE INVENTION

The present invention relates generally to apparatuses and methods for motion control systems for vehicles, and particularly to apparatuses and methods for motion control systems for underground vehicles.

BACKGROUND AND DESCRIPTION OF THE PRIOR ART

It is known to use apparatuses and methods to control the movement of vehicles as they travel from a stationary position through acceleration, deceleration, and back to a stationary position. Conventional apparatuses and methods, however, suffer from one or more disadvantages. For example, conventional apparatuses and methods undesirably consume excessive fuel and produce excessive noise and emissions. Conventional apparatuses and methods do not provide the required power and speed infinitely proportional through the power and speed range of the prime power source. Conventional apparatuses and methods also do not provide proportional hydrostatic engine braking.

It would be desirable, therefore, if an apparatus and method for a motion control system that could be provided that would not undesirably consume excessive fuel and produce excessive noise and emissions. It would also be desirable if such an apparatus and method for a motion control system could be provided that would provide the required power and speed infinitely proportional through the power and speed range of the prime power source. It would be further desirable if such an apparatus and method for a motion control system could be provided that would provide proportional hydrostatic engine braking.

Advantages of the Preferred Embodiments of the Invention

Accordingly, it is an advantage of the preferred embodiments of the invention claimed herein to provide an apparatus and method for a motion control system that does not undesirably consume excessive fuel or produce excessive noise or emissions. It is also an advantage of the preferred embodiments of the invention claimed herein to provide an apparatus and method for a motion control system that provides the required power and speed infinitely proportional through the power and speed range of the prime power source. It is another advantage of the preferred embodiments of the invention claimed herein to provide an apparatus and method for a motion control system that provides proportional hydrostatic engine braking.

Additional advantages of the preferred embodiments of the invention will become apparent from an examination of the drawings and the ensuing description.

SUMMARY OF THE INVENTION

The apparatus of the invention comprises a motion control system adapted for use on a vehicle having a prime mover with a power range and a speed range and at least one wheel. The preferred motion control system comprises a first control device that is operatively connected to the prime mover, a pump that is operatively connected to the prime mover and adapted to convey fluid, a second control device that is operatively connected to the pump, a fluid line that is adapted to convey fluid from the pump, a motor that is adapted to receive fluid from the fluid line and control the rotational speed of the at least one wheel, and a microprocessor that is adapted to provide a required amount of power and speed infinitely proportional through the power and speed range of the prime mover.

The method of the invention comprises a method for controlling the motion of a vehicle. The preferred method comprises providing a motion control system. The preferred motion control system comprises a first control device that is operatively connected to the prime mover, a pump that is operatively connected to the prime mover and adapted to convey fluid, a second control device that is operatively connected to the pump, a fluid line that is adapted to convey fluid from the pump, a motor that is adapted to receive fluid from the fluid line and control the rotational speed of the at least one wheel, and a microprocessor that is adapted to provide a required amount of power and speed infinitely proportional through the power and speed range of the prime mover. The preferred method further comprises controlling the motion of the vehicle.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
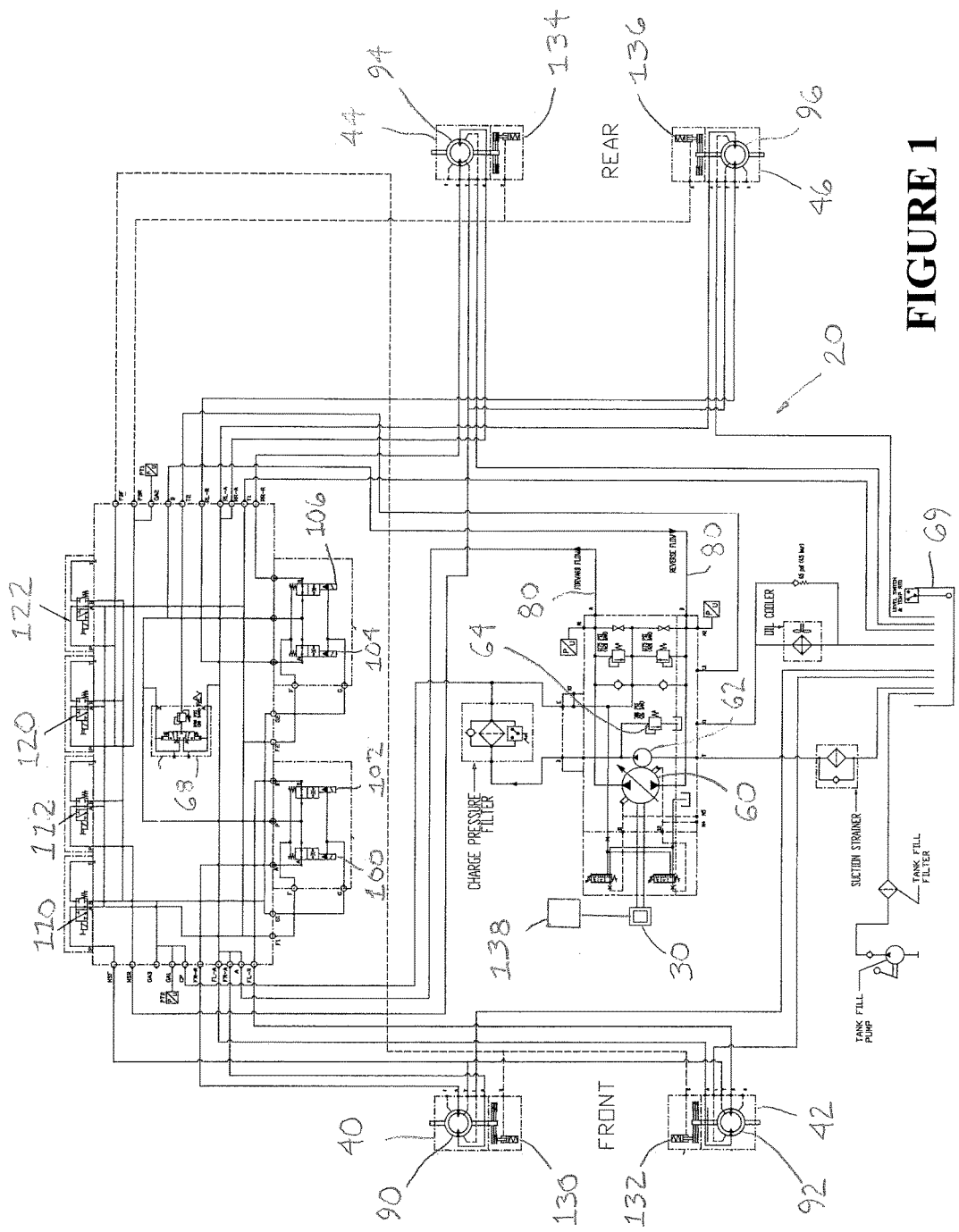
FIG. 1 is a schematic view of the preferred embodiment of the motion control system in accordance with the present invention.

Referring now to the drawings, the preferred embodiment of the apparatus and method for a motion control system in accordance with the present invention is illustrated by FIGS. 1 through 10. While FIGS. 1-10 illustrate the preferred embodiment of the apparatus and method for a motion control system, it is contemplated within the scope of the invention that the system is susceptible to various modifications and adaptations, including without limitation, those described herein.

Referring now to FIG. 1, a schematic view of the preferred motion control system in accordance with the present invention is illustrated. As shown in FIG. 1, the preferred motion control system is designated generally by reference numeral 20. Preferred motion control system 20 is adapted for use on a vehicle having a prime mover such as diesel engine 30. While diesel engine 30 is the preferred prime mover, it is contemplated within the scope of the invention that any suitable device, mechanism, assembly, or combination thereof such as a gas engine, an electric motor, and the like may be used as the prime mover. Preferred diesel engine 30 has a power range and a speed range. Preferred system 20 also comprises at least one wheel. Preferably, system 20 comprises a plurality of wheels 40, 42, 44, and 46. Preferred system 20 also comprises a first control device such as a travel pedal (see also FIG. 2) which is operatively connected to the prime mover.

Still referring to FIG. 1, preferred system 20 further comprises a pump which is operatively connected to the prime mover and adapted to convey fluid. Preferably, the pump is hydrostatic pump 60 having a swash plate. More particularly, preferred hydrostatic pump 60 is a closed loop variable displacement piston pump with integrated charge pump 62 capable of providing fluid flow for forward and reverse motion of the vehicle. Preferred charge pump 62 is also adapted to replenish oil in the closed loop circuit lost from component drains, leakage, and through the flushing valve. The preferred charge pump includes integrated relief valve 64 set to approximately 26 bar (377 psi) and a 9 micron filter. Preferred hydrostatic pump 60 operates on 24V servo displacement control with circuit relief valves set to approximately 420 bar (6091 psi) on both sides of the pump. Further, preferred hydrostatic pump 60 has a maximum displacement of approximately 180 cc/rev. While hydrostatic pump 60 is the preferred pump of system 20, it is contemplated within the scope of the invention that the pump may be any suitable device, mechanism, assembly, or combination thereof adapted to convey fluid.

Still referring to FIG. 1, preferred system 20 also comprises flushing valve 68. Preferred flushing valve is a closed circuit flushing valve comprising a pilot operated directional valve and a low pressure relief valve. Preferably, when the hydrostatic transmission is in neutral, the flushing valve serves no function, the directional valve is centered, the gallery to the low pressure relief valve is blocked, and the charge pressure is maintained by the charge relief valve in the transmission pump. By contrast, when the hydrostatic transmission is in forward or reverse, the flushing valve operates so that charge pressure in the low pressure side of the loop is maintained by the relief valve incorporated in the flushing valve and the high pressure side of the loop pilots the directional valve, thereby opening the low pressure side of the loop to the relief valve gallery. Preferably, the relief valve incorporated in the flushing valve is set to approximately 60 psi lower than the charge pump relief valve located in the transmission pump. In order to avoid excessive fluid heat in the closed loop circuit, preferred flushing valve 68 exchanges fluid in the closed loop circuit with fluid in reservoir 69. More particularly, cool fluid from the reservoir is drawn by the charge pump thereby charging the low pressure side of the loop through the check valve located close to the transmission pump inlet, and the volume of hot fluid that is not required to maintain the charge pressure in the low pressure side of the loop leaves the motor outlet and vents across the flushing valve relief into the case of the motor and back to the reservoir usually via the pump case.

Still referring to FIG. 1, preferred system 20 still further comprises a second control device such as a brake pedal (see FIG. 2) which is operatively connected to pump 60. In addition, preferred system 20 comprises fluid line 80 which is adapted to convey fluid from pump 60.

Still referring to FIG. 1, preferred system 20 also comprises a motor that is adapted to receive fluid from fluid line 80 and control the rotational speed of the at least one wheel. Preferably, the motor comprises hydraulic wheel drives 90, 92, 94, and 96 which are adapted to control the rotational speed of wheels 40, 42, 44, and 46, respectively. Preferred hydraulic wheel drives 90, 92, 94, and 96 are cam-lobe radial piston dual displacement hydraulic motors each having an integrated spring apply/hydraulic release wet disc brake for park and emergency functions. Preferably, each wheel drive 90, 92, 94, and 96 also has a wheel speed sensor which is adapted to control traction of the vehicle's wheels and the wheel speed during turning operations. Each preferred wheel drive has two speed controls. In one preferred embodiment, wheel drives 90 and 92 have a minimum displacement of approximately 14.3 cu. in/rev and a maximum displacement of approximately 28.5 cu. in/rev. Also in this preferred embodiment, wheel drives 94 and 96 have a minimum displacement of approximately 19.1 cu. in/rev and a maximum displacement of approximately 38.1 cu. in/rev. While wheel drives 90, 92, 94, and 96 are the preferred motors, it is contemplated within the scope of the invention that the motor may be any suitable device, mechanism, assembly, or combination thereof adapted to receive fluid from the fluid line and control the rotational speed of the at least one wheel such as bent axis piston motors, piston motors, and the like.

Still referring to FIG. 1, preferably, for each wheel drive 90, 92, 94, and 96 a traction control valve is provided in order to meter flow out of each wheel drive. The preferred traction control valves 100, 102, 104, and 106 are also adapted to regulate the flow of fluid to each wheel drive in order to provide the desired speed and optimize traction. When the preferred SmartDrive Off-Road module senses a wheel slip at one or more wheels, the corresponding traction control valve is automatically closed using a 24V solenoid, fluid flow to the corresponding wheel drive is stopped, and such fluid flow is directed to the wheel(s) with traction. Preferred traction control valves are also used to improve the steering of the vehicle using a position sensor in the steer cylinder. More particularly, the preferred traction control valves regulate the flow of fluid to each wheel drive to maintain proper wheel speed depending upon the position of the steering cylinder.

Still referring to FIG. 1, the preferred motors also comprise a motor shift control valve 110 and 112 which is adapted to shift the motor between low and high displacement when a gear is selected either manually or automatically. Preferably, the motor is shifted using charge pump pressure. More particularly, when the transmission is in first gear, wheel drives 90, 92, 94, and 96 are in high displacement (2C/2C). When the transmission is in second gear, wheel drives 90 and 92 are in low displacement and wheel drives 94 and 96 are in high displacement (1C/2C). When the transmission is in third gear, wheel drives 90, 92, 94, and 96 are in low displacement (1C/1C). Preferably, the gears are shifted using 24V solenoids.

Still referring to FIG. 1, preferred system 20 also comprises emergency/parking brake on/off control valves 120 and 122. Preferred control valves 120 and 122 are adapted to apply and release the emergency/parking brakes 130, 132, 134, and 136 when requested by the operator or automatically as required by the vehicle control logic. More particularly, preferred control valves 120 and 122 are adapted to automatically apply the emergency/parking brake when the vehicle comes to a stopped or stationary position. The emergency/parking brake is preferably released using charge pump pressure. In addition, a number of other parameters may automatically apply the emergency/parking brake. For example, the emergency/parking brake may be automatically applied by an automatic braking application (ABA) in the event of a power loss in which case the emergency/parking brake valve is energized to open, thereby releasing the spring applied hydraulically released (SAHR) brake. The ABA may also automatically apply the emergency/parking brake when the engine is not running or running at a low RPM such as less than 500 RPM. The ABA may also automatically apply the emergency/parking brake when the pressure level in the forward flow high pressure circuit and/or the reverse flow high pressure circuit falls beneath a certain pre-determined level such as less than 12 Bar. Similarly, the ABA may also automatically apply the emergency/parking brake when the pressure level in the charge pressure circuit or the park brake pressure circuit falls beneath a certain pre-determined level such as less than 12 Bar.

Still referring to FIG. 1, the ABA may also automatically apply the emergency/parking brake when the forward circuit, the reverse circuit, and/or charge circuit do not pressurize at start-up. The ABA may also automatically apply the emergency/parking brake when the charge pressure sensor and/or the park brake pressure sensor detects a problem such as an open circuit, a shorted circuit, and/or a pressure level higher than a certain pre-determined level such as more than 100 Bar or more than 4 Bar at microprocessor or programmable logic controller (PLC) power up. The ABA may also automatically apply the emergency/parking brake when a park brake button problem is detected such as both the reset and apply inputs are high at the same time. The ABA may also automatically apply the emergency/parking brake when the pressure level present at the park brake is higher than a certain pre-determined level when the park brake coils are de-energized such as more than 5 Bar. The ABA may also automatically apply the emergency/parking brake when the forward flow high pressure sensor and/or the reverse flow high pressure sensor detects a problem such as an open circuit, a shorted circuit, and/or a pressure level above a certain pre-determined pressure level such as more than 4 Bar at microprocessor or PLC power up. The ABA may also automatically apply the emergency/parking brake when the system detects a communication failure such as loss of contact with SDeasy or the engine and/or when the cable reel shutdown limit is reached. The ABA may also automatically apply the emergency/parking brake when the fire suppression system is activated as a result of a loss of control power.

Still referring to FIG. 1, after application of the emergency/parking brake by the ABA, the brake must be manually reset via the emergency/parking brake button.

Figure 3:
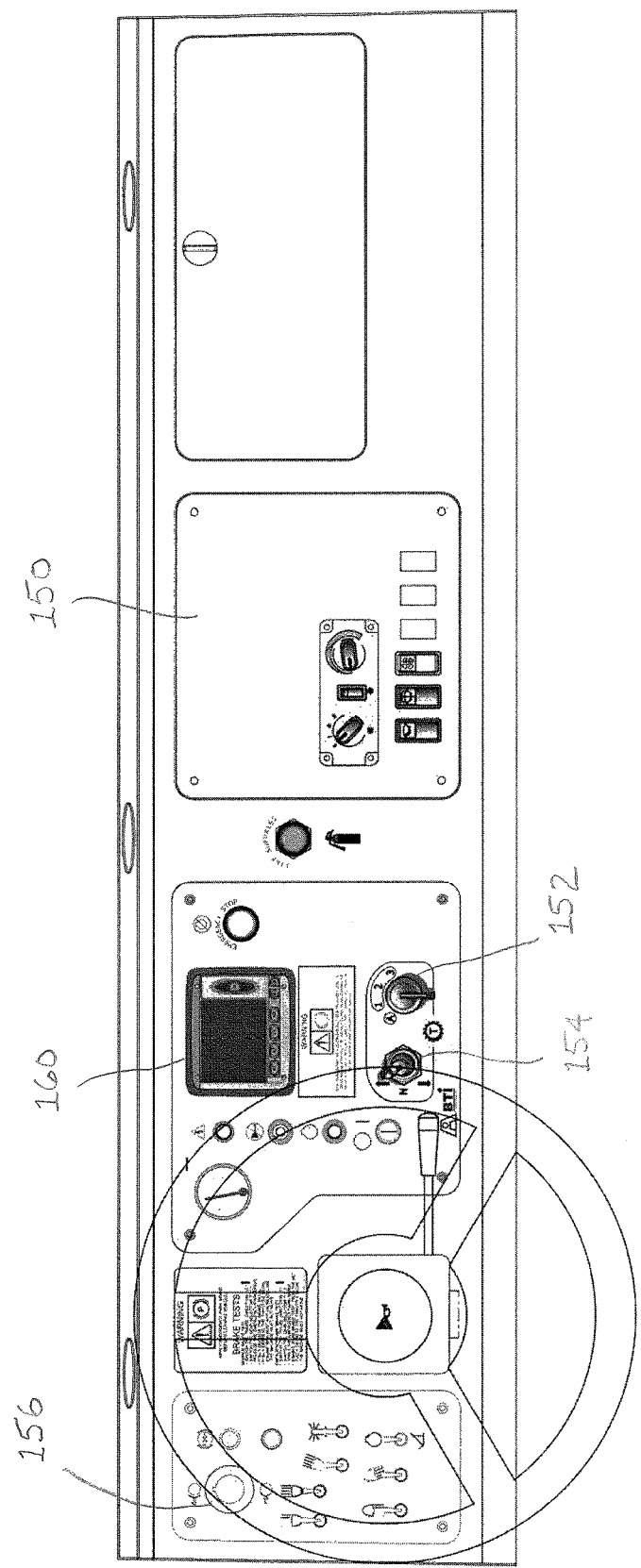
FIG. 3 is a front view of the preferred dashboard of the motion control system illustrated in FIG. 1.
Figure 4:
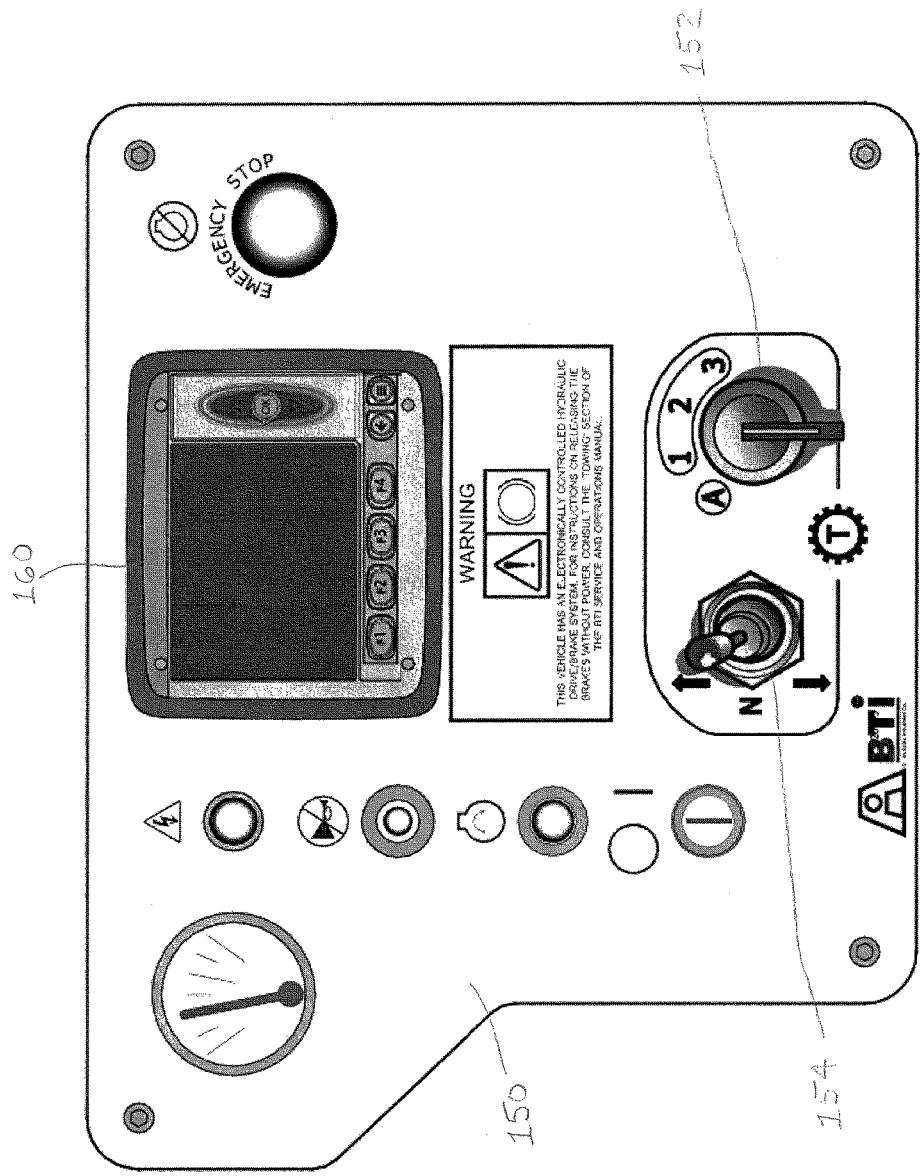
FIG. 4 is a front view of a portion of the preferred dashboard illustrated in FIG. 3.

Still referring to FIG. 1, the emergency/parking brake may be manually applied by pressing the emergency/parking brake button (see also FIG. 3-4).

Still referring to FIG. 1, preferred system 20 further comprises microprocessor 138 that is adapted to provide and optimize the required amount of power providing speed infinitely proportional through the power and RPM range of the prime mover. More particularly, preferred microprocessor 138 is adapted to provide an automatically infinitely proportional control of the displacement of the hydraulic pump as the available power range of the engine changes via movement of the travel pedal. Preferably, the power range of the engine moves between idle (approximately 650 rpm) and full governed load (approximately 2300 rpm), and the hydraulic pump displacement moves between a minimum displacement (approximately 0 cubic inches/revolution) and a maximum displacement (approximately 6 cubic inches/revolution) in order to optimize flow and vehicle speed. Further, preferred microprocessor 138 is also adapted to develop the pressure required for the tractive effort (TE) and thus the output torque required from the hydraulic motors. The required TE is determined based upon the rolling resistance and the grade resistance. As a result, preferred microprocessor 138 is adapted to provide an optimized vehicle speed capability that is infinitely proportional through the RPM and power band of the prime mover. Preferred microprocessor 138 is programmable.

Figure 2:
FIG. 2 is a perspective view of the preferred operator compartment of the motion control system illustrated in FIG. 1.

Referring now to FIG. 2, a perspective view of the preferred embodiment of the vehicle operator compartment is illustrated. As shown in FIG. 2, the preferred vehicle operator compartment is designated generally by reference numeral 140. Preferred vehicle operator compartment 140 comprises a first control device such as travel pedal 142 and a second control device such as brake pedal 144. In addition, preferred vehicle operator compartment 140 comprises vehicle dashboard 150.

Referring now to FIG. 3, a front view of the preferred embodiment of the vehicle dashboard is illustrated. As shown in FIG. 3, the preferred vehicle dashboard 150 comprises gear selection switch 152, travel direction switch 154, emergency/parking brake button 156, and human machine interface (HMI) 160. See also FIGS. 4-9. Preferred gear selection switch 152 allows the operator to manually switch between first gear, second gear, and third gear. Preferred gear switch 152 also allows the operator to manually select automatic gear switching between first gear, second gear, and third gear. Preferred travel direction switch 154 allows the operator to manually switch between forward travel direction, neutral, and reverse travel direction. Preferred emergency/parking brake button 156 allows the operator to manually engage the emergency/parking brake and to manually disengage the emergency/parking brake. Preferred HMI 160 allows the operator to automatically control certain functions of the motion control system.

Referring now to FIG. 4, a front view of a portion of preferred vehicle dashboard 150. As shown in FIG. 4, the preferred vehicle dashboard 150 comprises gear selection switch 152, travel direction switch 154, and HMI 160.

Figure 5:
FIG. 5 is a front view of the preferred human machine interface illustrated in FIGS. 3-4 shown in the tram adjust mode.

Referring now to FIG. 5, a front view of preferred human machine interface (HMI) 160 is illustrated. As shown in FIG. 5, preferred HMI 160 allows the operator to adjust the motion of the vehicle. More particularly, preferred HMI 160 allows the operator to select either $3^{rd}$ gear lockout, travel speed governor (auto), or travel speed governor (manual).

Figure 6:
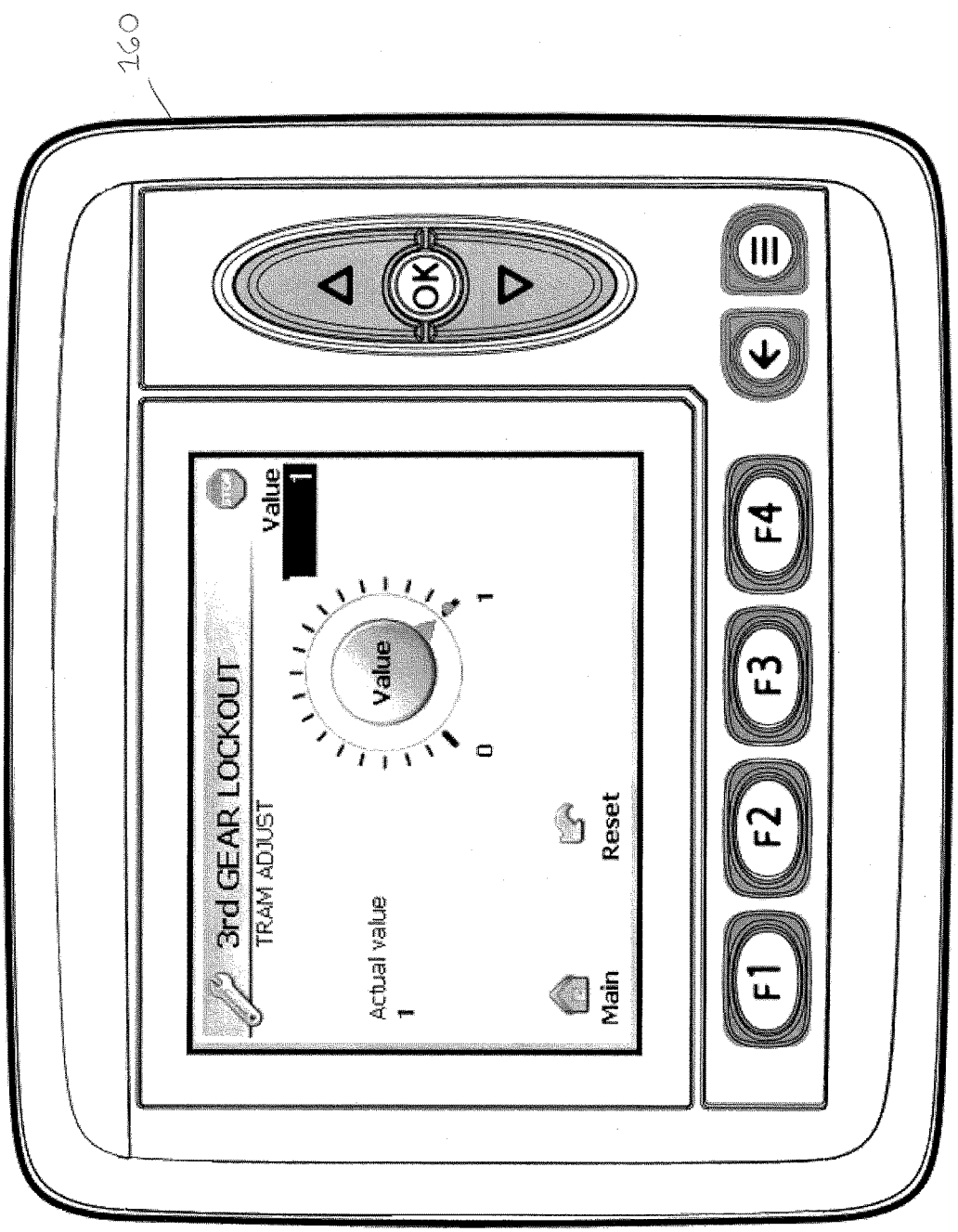
FIG. 6 is a front view of the preferred human machine interface illustrated in FIGS. 3-5 shown in the $3^{rd}$ gear lockout mode.

Referring now to FIG. 6, a front view of preferred HMI 160 is illustrated in the $3^{rd}$ gear lockout mode. In this mode, the $3^{rd}$ gear of the motion control system is disabled such that the vehicle can be operated in only $1^{st}$ and $2^{nd}$ gears when the value is set at 1. The preferred unit of measure (UOM) is binary, and the default value is 0.

Figure 7:
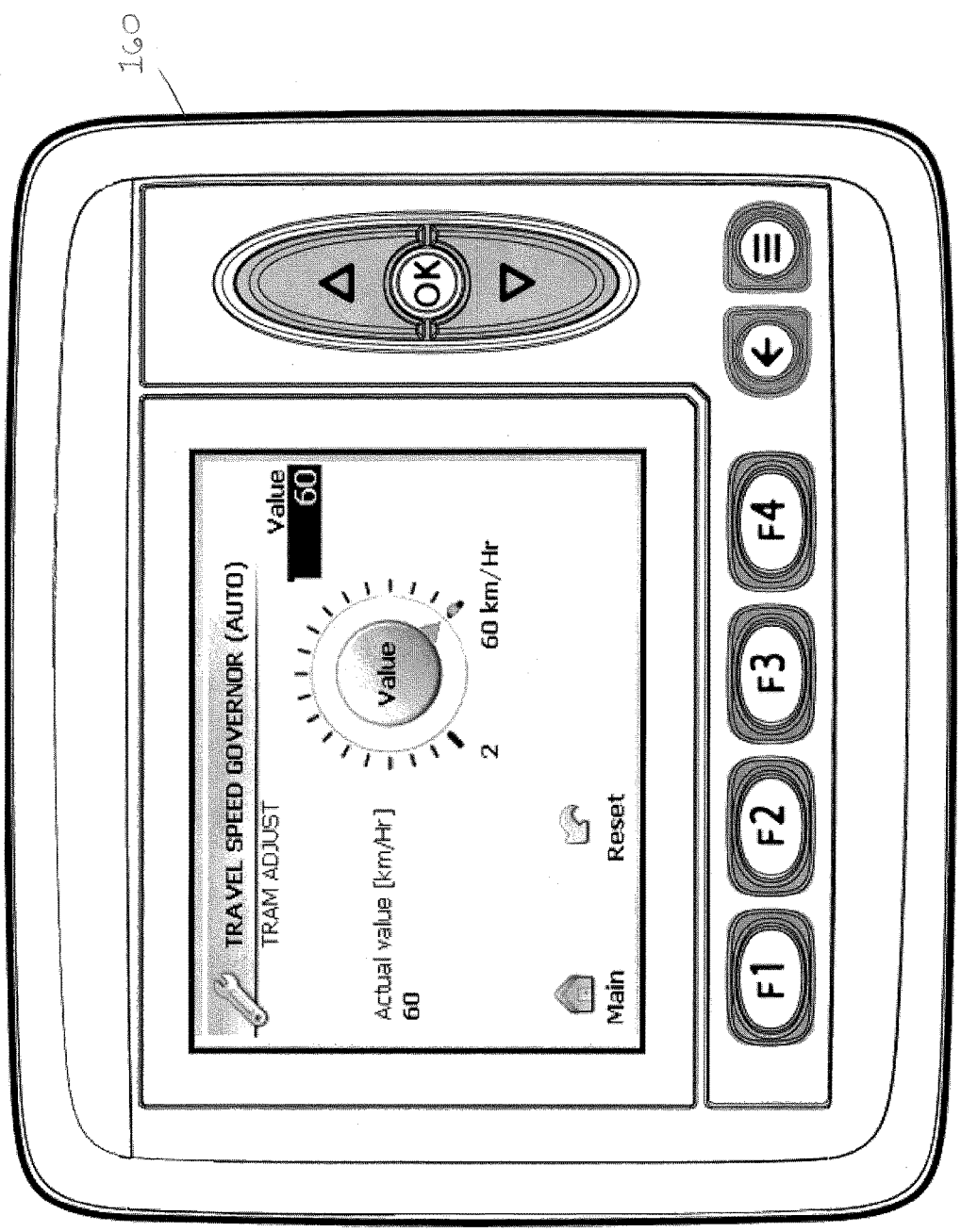
FIG. 7 is a front view of the preferred human machine interface illustrated in FIGS. 3-6 shown in the travel speed governor (auto) mode.

Referring now to FIG. 7, a front view of preferred HMI 160 is illustrated in the travel speed governor (auto) mode. In this mode, the travel speed of the vehicle is limited to the value, i.e. 60 km/hr. The preferred adjustable range is 2 km/hr to 60 km/hr, and the default value is 60 km/hr. The preferred UOM is km/hr, but it is contemplated within the scope of the invention that the UOM may be expressed in Imperial units.

Figure 8:
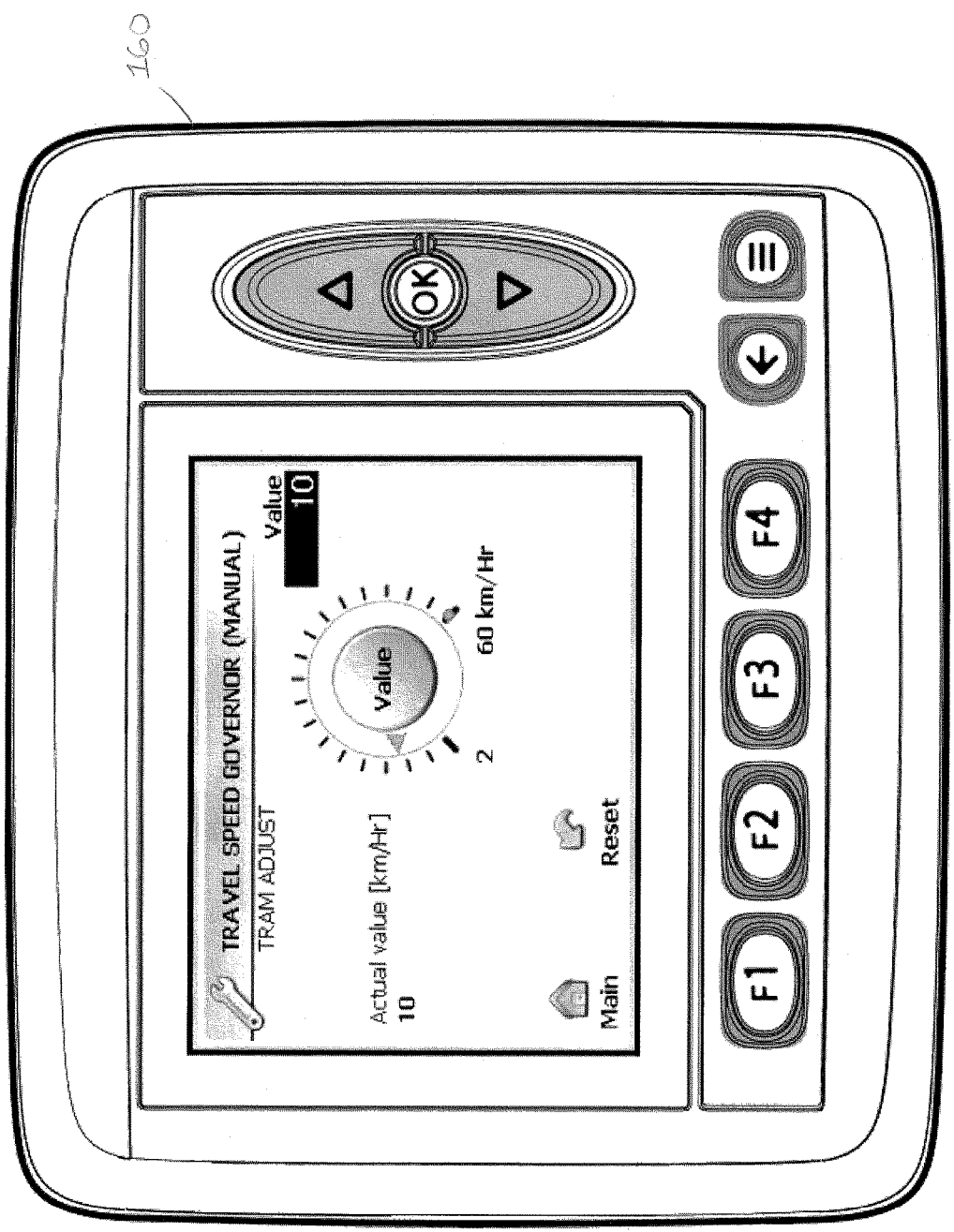
FIG. 8 is a front view of the preferred human machine interface illustrated in FIGS. 3-7 shown in the travel speed governor (manual) mode.

Referring now to FIG. 8, a front view of preferred HMI 160 is illustrated in the travel speed governor (manual) mode. In this mode, the travel speed of the vehicle is limited to the value, i.e. 10 km/hr. The preferred adjustable range is 2 km/hr to 60 km/hr, and the default value is 60 km/hr. The preferred UOM is km/hr.

Figure 9:
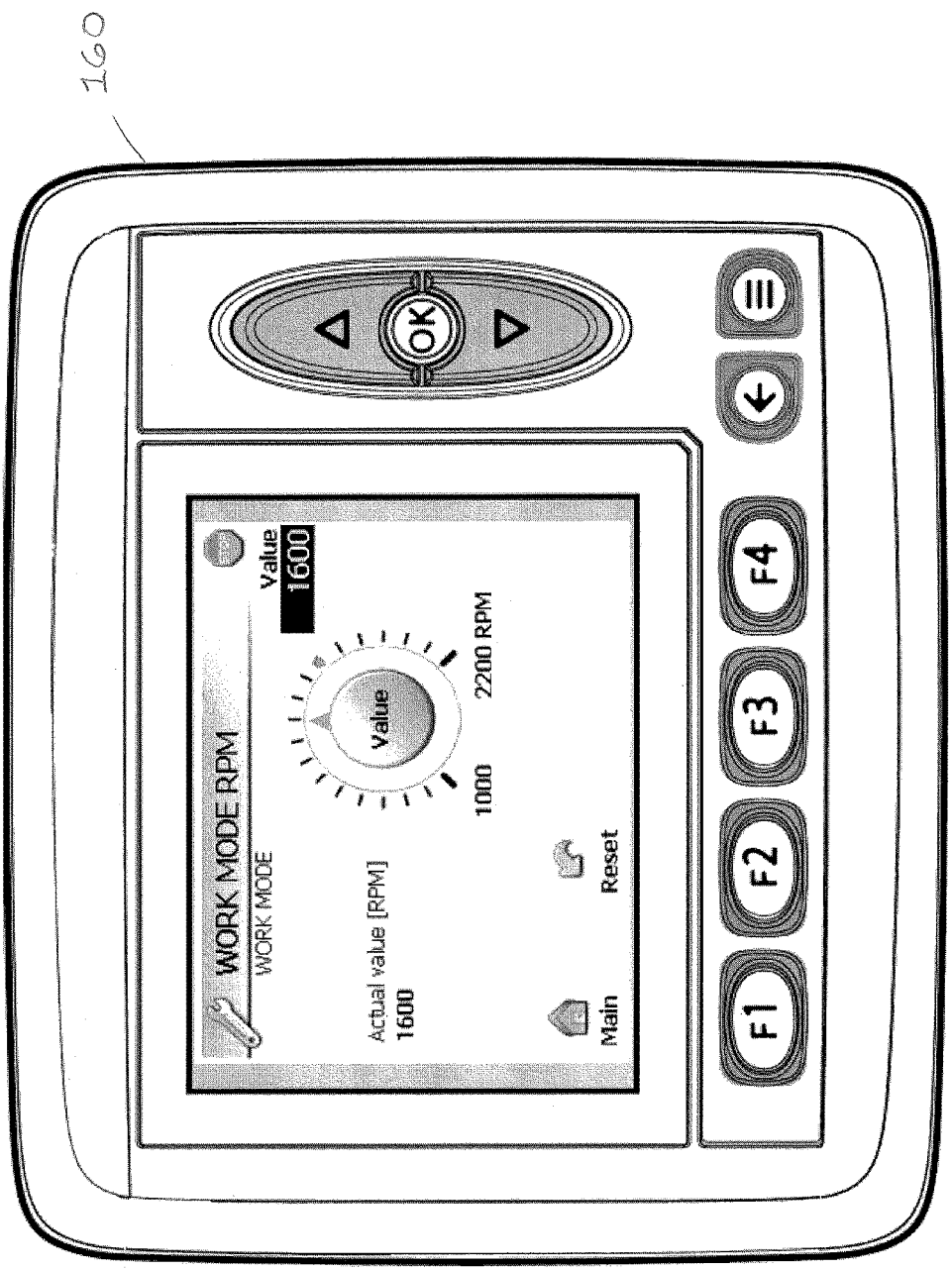
FIG. 9 is a front view of the preferred human machine interface illustrated in FIGS. 3-8 shown in the work mode rpm mode.

Referring now to FIG. 9, a front view of preferred HMI 160 is illustrated in the work mode rpm mode. In this mode, the engine runs at a fixed speed, i.e. 1600 rpm. The preferred adjustable range is 1000-2200 rpm, and the default value is 1800 km/hr. The preferred UOM is rpm. Preferably, the work mode is enabled when the binary toggle switch value is 1. It is also contemplated within the scope of the invention that preferred HMI 160 may be controlled remotely such as via a modem.

Figure 10:
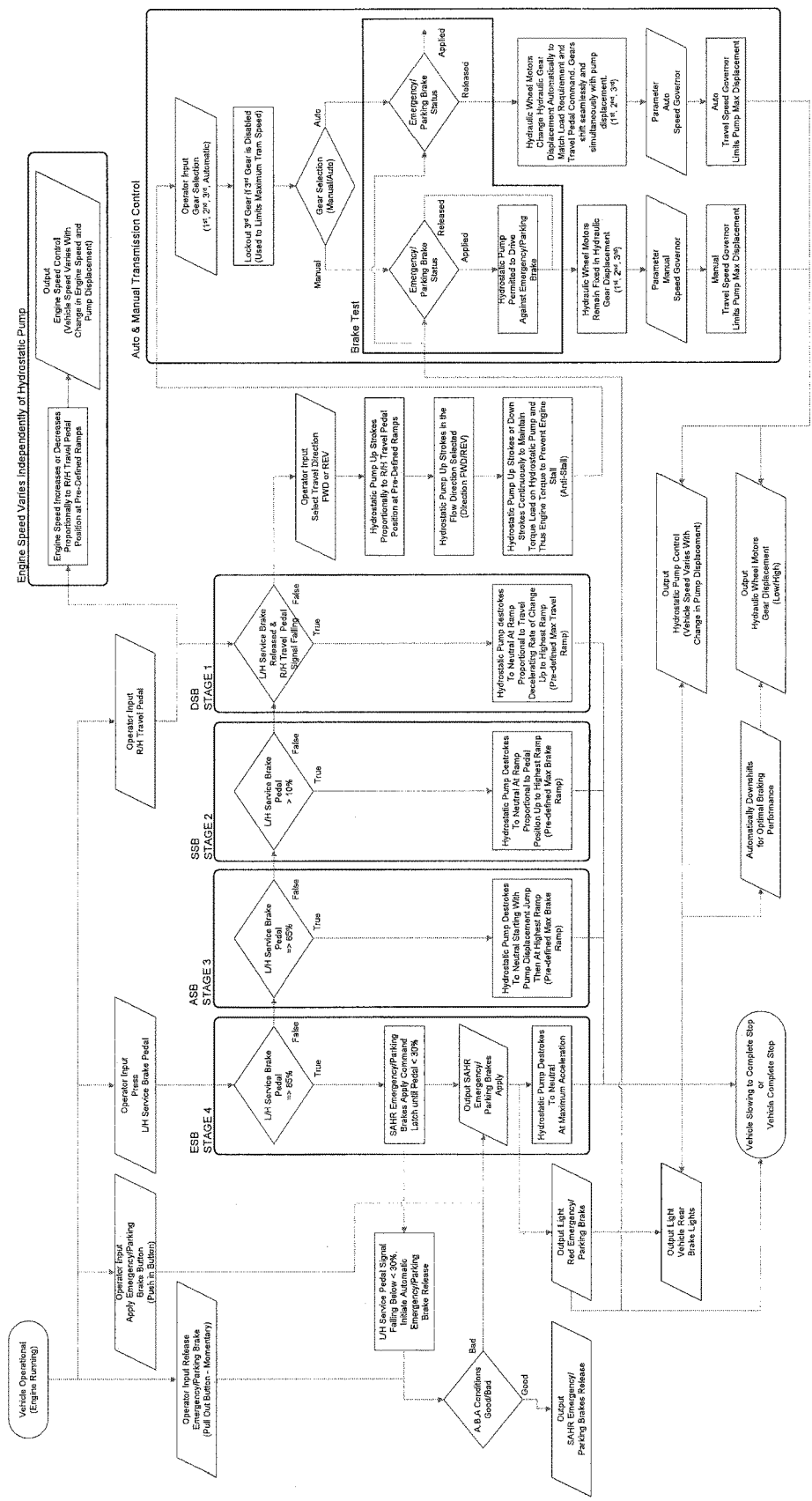
FIG. 10 is a flow chart illustrating the preferred method for controlling the motion of a vehicle using the preferred motion control system.

Referring now to FIG. 10, a flow chart illustrating the preferred method for controlling the motion of a vehicle using preferred motion control system 20 is illustrated. As shown in FIG. 10, preferred motion control system 20 is initiated by starting the engine of the vehicle. Next, the vehicle operator may release the emergency/parking brake via a dashboard button. Preferred motion control system 20 then determines the ABA conditions. If the conditions are favorable, then the emergency/parking brake is released. However, if the conditions are unfavorable, then the emergency/parking brake is activated, the hydrostatic pump is de-stroked to neutral at a maximum acceleration, an emergency/parking brake light in the vehicle is activated, brake lights of the rear of the vehicle are activated, and the vehicle remains in a stationary position.

Still referring to FIG. 10, the vehicle operator may activate the emergency/parking brake manually by pushing a dashboard button after starting the engine of the vehicle. By doing so, the emergency/parking brake is activated, the hydrostatic pump is de-stroked to neutral at a maximum acceleration, an emergency/parking brake light in the vehicle is activated, brake lights of the rear of the vehicle are activated, and the vehicle remains in a stationary position.

Still referring to FIG. 10, the vehicle operator may also apply a force to the brake pedal after starting the engine of the vehicle. As described below in more detail, preferred motion control system 20 comprises three distinct braking systems that may be engaged by applying a force to the brake pedal, i.e. the emergency service braking system, the accelerated service braking system, and the standard service braking system.

Still referring to FIG. 10, preferred motion control system also comprises emergency service braking system. Preferred emergency service braking system is adapted to provide braking in emergency or panic situations. Preferably, emergency service braking system is activated when the force applied to the brake pedal moves the pedal to a position that equals or exceeds approximately 85% of the maximum range of motion that the brake pedal. When such a force is applied to the brake pedal, spring applied, hydraulically released (SAHR) brakes are activated and a command latch is applied until the force on the brake pedal results in the movement of the pedal to a position that is less than approximately 30% of the maximum range of motion of the brake pedal. When such a force is applied to the brake pedal, an automatic brake release is initiated. Preferably, the emergency service braking system then automatically determines whether conditions are favorable or unfavorable using an automatic brake application (ABA). If the conditions are favorable, then the system releases the SAHR emergency/parking brake. If the conditions are unfavorable, then the system activates the SAHR emergency/parking brake and the vehicle comes to a stop.

More particularly, the ABA will automatically activate the SAHR emergency/parking brake under four conditions. First, the ABA will automatically activate the emergency/parking brake when the "closed loop" hydrostatic pressure drops below a predetermined minimum level, thereby reducing the dynamic service braking oil pressure. Preferably, the "closed loop" hydrostatic pressure is monitored by normally open pressure switches in the forward and reverse high pressure loop lines. The preferred ABA will also automatically activate the emergency/parking brake when the common "charge pressure" supply line/circuit drops below a predetermined minimum level indicating low charge pressure supplying the forward and reverse or the low pressure side of the main "closed loop" hydrostatic circuit. In addition, the preferred ABA will automatically activate the emergency/parking brake in the event of an electrical failure. In such event, solenoids in the emergency/parking brake system are de-energized and the SAHR emergency/parking brakes are activated.

Finally, the preferred ABA will automatically activate the emergency/parking brake when the pressure level between two switches in either the charge pressure circuit or the high pressure loop circuit is different by at least approximately 20% of the switch with the lower pressure reading. Preferably, the switch with the higher pressure reading controls an amber light which indicates an impending emergency/parking brake warning, and the switch with the lower pressure reading controls a red light and automatically activates the SAHR emergency/parking brake. When the SAHR emergency/parking brakes are activated, hydrostatic pump de-strokes to neutral at the maximum deceleration, an emergency/parking brake light is activated in the vehicle, the vehicle's rear brake lights are activated, and the vehicle slows down accordingly. Eventually, the vehicle comes to a stationary position. Preferred motion control system 20 also comprises an ABA emergency/parking brake button which must be manually activated to release the SAHR emergency/parking brakes after all SAHR emergency/parking brake applications, whether manually initiated or initiated by the ABA. The preferred emergency service braking system provides feedback to the vehicle operator by increasing the pedal force (spring rate) in the brake pedal to warn the operator that an extremely rapid emergency service braking system stop is about to occur.

Still referring to FIG. 10, preferred motion control system 20 also comprises an emergency/parking brake test. The vehicle operator can place the vehicle in test condition by manually selecting $2^{nd}$ gear (either forward or reverse) and allowing the engine RPM to be throttled up to the maximum RPM to determine if the hydrostatic pump will cause the vehicle to travel any distance. In preferred control system 20, the vehicle should not travel any distance, either forward or reverse, under such conditions.

Still referring to FIG. 10, preferred motion control system also comprises accelerated service braking system. Preferred accelerated service braking system is adapted to provide a more rapid braking system. Preferably, accelerated service braking system is activated when the force applied to the brake pedal moves the pedal to a position that equals or exceeds approximately 65% of the maximum range of motion of the brake pedal. When such a force is applied to the brake pedal, hydrostatic pump is de-stroked to neutral starting with a pump displacement jump and then proceeding at the highest pre-determined maximum brake ramp. In addition, the vehicle's rear brake lights are activated and the vehicle slows down accordingly. Finally, the vehicle comes to a stationary position and the emergency/parking brake is automatically activated.

Still referring to FIG. 1Q, preferred motion control system also comprises standard service braking system. Preferred standard service braking system is activated by applying a force to the brake pedal which de-strokes hydrostatic pump from its then existing position to zero stroke proportionately to the brake pedal travel position. Preferred standard service braking system is adapted to be engaged when the force applied to the brake pedal moves the pedal to a position that exceeds approximately 10% of the maximum range of motion of the brake pedal. When such a force is applied to the brake pedal, hydrostatic pump de-strokes to neutral at the ramp proportional to the pedal position up to the highest pre-determined maximum brake ramp. In addition, the vehicle's rear brake lights are activated and the vehicle slows down accordingly. Finally, the vehicle comes to a stationary position and the emergency/parking brake is automatically activated.

Still referring to FIG. 10, the operator may apply a force to the travel pedal of the vehicle after starting the engine. More particularly, in the event that the operator applies no force to the brake pedal and the force applied to the travel pedal is gradually reduced, then the preferred motion control system's dynamic service braking system is engaged. Preferred dynamic braking system comprises a closed-loop hydrostatic circuit by letting off the throttle pedal and initiating a pre-programmed, controlled rate of deceleration. More particularly, when the throttle pedal is released, hydrostatic pump de-strokes to the neutral position at the ramp causing the deceleration rate to be proportional to the then existing rate of travel, i.e. speed of the item of equipment. The rate of deceleration change is up to the highest pre-determined maximum travel ramp. In addition, the vehicle's rear brake lights are activated and the vehicle slows down accordingly. Finally, the vehicle comes to a stationary position and the emergency/parking brake is automatically activated.

Still referring to FIG. 10, in the event that the vehicle operator intends to apply a force to the travel pedal, then the operator preferably selects either a forward or reverse direction of travel. Upon doing so, hydrostatic pump upstrokes proportionally to the travel pedal position at pre-determined ramps and in the flow direction of the selected direction of travel. In addition, the hydrostatic pump upstrokes (or de-strokes) continuously so as to maintain a torque load on the pump and the vehicle's engine in order to prevent the engine from stalling.

Still referring to FIG. 10, after the vehicle operator selects a direction of travel, the operator may also select either manual or automatic transmission. In the event that the operator selects manual transmission, preferred motion control system 20 determines the status of the emergency/parking brake. If the emergency/parking brake is activated, then the hydrostatic pump/motor power train is permitted to drive against the emergency/parking brake. After the emergency/parking brake is deactivated, the hydraulic wheel motors preferably remain fixed in the selected gear displacement, e.g. $1^{st}$, $2^{nd}$, or $3^{rd}$ gear. In addition, preferred motion control system 20 includes a manual speed governor to prevent the vehicle from travelling at speeds in excess of a predetermined maximum speed. The preferred manual speed governor limits the maximum displacement of the hydrostatic pump. As the displacement of the hydrostatic pump decreases, the vehicle slows down.

Still referring to FIG. 10, in the event the operator selects automatic transmission, preferred motion control system 20 determines the status of the emergency/parking brake. In the event the emergency/parking brake is not activated, the preferred hydraulic wheel motors are adapted to change gear displacements automatically to match the load requirements and the travel pedal command. Preferably, the gears shift seamlessly and simultaneously with changes in the hydrostatic pump displacement. Preferred motion control system 20 also comprises an automatic speed governor which is adapted to limit the maximum displacement of the hydrostatic pump. As the displacement of the hydrostatic pump decreases, the vehicle slows down.

Still referring to FIG. 10, regardless of whether the vehicle operator selects manual or automatic transmission, the vehicle operator may lock out $3^{rd}$ gear in order to prevent the vehicle from reaching higher speeds. Also regardless of whether the vehicle operator selects manual or automatic transmission, preferred motion control system 20 is adapted to provide the vehicle operator with real-time data relating to the displacement of the hydrostatic pump and the hydraulic wheel motors.

Still referring to FIG. 10, in preferred motion control system 20, the engine speed may vary independent from the hydrostatic pump displacement. Preferably, the engine speed varies proportionally to the position of the travel pedal at predetermined rate of change. Preferred motion control system 20 is also adapted to provide the vehicle operator with data relating to the engine's speed. The speed of the vehicle with vary depending upon the engine speed and the pump displacement.

In operation, several advantages of the preferred embodiments of the preferred apparatus and method for a motion control system are achieved. For example, the preferred embodiments of the motion control system are adapted to reduce fuel consumption, emissions, and noise. The preferred embodiments of the motion control system are also adapted to provide the required power and speed infinitely proportional through the power and speed range of the prime power source. In addition, the preferred embodiments of the motion control system are adapted to provide proportional hydrostatic engine braking.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A motion control system adapted for use on a vehicle having a prime mover with a power range and a speed range and at least one wheel, said motion control system comprising:
    (a) a first control device, said first control device being operatively connected to the prime mover;
    (b) a pump, said pump being operatively connected to the prime mover and being adapted to convey fluid;

(c) a second control device, said second control device being operatively connected to the pump;

(d) a fluid line; said fluid line being adapted to convey fluid from the pump;

(e) a motor, said motor being adapted to receive fluid from the fluid line and control the rotational speed of the at least one wheel;

(f) a microprocessor, said microprocessor being adapted to provide a required amount of power and speed infinitely proportional through the power and speed range of the prime mover;

wherein the second control device includes an automatic and dynamic braking system have a multi-stage brake pedal.

2. The motion control system of claim 1 wherein the first control device comprises a travel pedal.

3. The motion control system of claim 1 wherein the pump comprises a hydrostatic pump.

4. The motion control system of claim 1 wherein the pump comprises a swash plate.

5. The motion control system of claim 1 wherein the second control device comprises a brake pedal.

6. The motion control system of claim 1 wherein the motor comprises a hydraulic wheel drive.

7. The motion control system of claim 1 wherein the prime mover comprises a diesel engine.

8. The motion control system of claim 1 wherein the prime mover comprises an electric motor.

9. The motion control system of claim 1 wherein the microprocessor is programmable.

10. The motion control system of claim 1 wherein the motion control system comprises a manual gear selection switch.

11. The motion control system of claim 1 wherein the motion control system comprises an automatic gear selection switch.

12. The motion control system of claim 1 wherein the motion control system comprises a forward travel direction switch.

13. The motion control system of claim 1 wherein the motion control system comprises a reverse direction selection switch.

14. The motion control system of claim 1 wherein the motion control system comprises a neutral direction selection switch.

15. The motion control system of claim 1 wherein the motion control system further comprises a standard service braking system.

16. The motion control system of claim 1 wherein the motion control system further comprises a dynamic service braking system.

17. The motion control system of claim 1 wherein the motion control system further comprises an accelerated service braking system.

18. The motion control system of claim 1 wherein the motion control system further comprises an emergency service braking system.

19. The motion control system of claim 1 wherein the motion control system further comprises an emergency/parking brake.

20. The motion control system of claim 19 wherein the motion control system further comprises an automatic brake application which is adapted to automatically activate the emergency/parking brake.

21. The motion control system of claim 19 wherein the motion control system further comprises an emergency/parking brake button.

* * * * *